(12) United States Patent
Yang et al.

(10) Patent No.: US 8,909,063 B2
(45) Date of Patent: Dec. 9, 2014

(54) OPTICAL QPSK SIGNAL REGENERATION AND AMPLIFICATION

(71) Applicant: Fujitsu Network Communications, Inc., Richardson, TX (US)

(72) Inventors: Jeng-Yuan Yang, Garland, TX (US); Youichi Akasaka, Allen, TX (US); Motoyoshi Sekiya, Richardson, TX (US); Inwoong Kim, Allen, TX (US)

(73) Assignee: Fujitsu Limited, Kawasaki-shi (JP)

( * ) Notice: Subject to any disclaimer, the term of this patent is extended or adjusted under 35 U.S.C. 154(b) by 219 days.

(21) Appl. No.: 13/665,254

(22) Filed: Oct. 31, 2012

(65) Prior Publication Data

US 2014/0119743 A1    May 1, 2014

(51) Int. Cl.
*H04B 10/291* (2013.01)

(52) U.S. Cl.
USPC .......................... 398/180; 398/157; 398/175

(58) Field of Classification Search
CPC ................ H04B 10/2971; H04B 10/2912
USPC .......................................... 398/157, 175, 180
See application file for complete search history.

(56) References Cited

U.S. PATENT DOCUMENTS

| | | | |
|---|---|---|---|
| 5,386,314 A | 1/1995 | Jopson | 359/326 |
| 5,400,164 A | 3/1995 | Kurtzke et al. | 398/150 |
| 6,529,314 B1 | 3/2003 | Shukunami et al. | 359/332 |
| 7,164,526 B2 | 1/2007 | McKinstrie et al. | 359/330 |
| 7,304,788 B2 | 12/2007 | McKinstrie | 359/332 |
| 7,369,779 B1 | 5/2008 | Croussore et al. | 398/176 |
| 7,483,203 B2 | 1/2009 | McKinstrie | 359/333 |
| 8,032,024 B2 | 10/2011 | Centanni et al. | 398/48 |
| 8,098,989 B2 | 1/2012 | Yu | 398/65 |
| 2009/0279164 A1* | 11/2009 | Matsumoto | 359/334 |
| 2011/0176202 A1 | 7/2011 | Kato et al. | 359/337.5 |
| 2013/0087689 A1 | 4/2013 | Woodward et al. | 250/216 |
| 2013/0208334 A1 | 8/2013 | Kakande et al. | 359/246 |
| 2013/0301661 A1 | 11/2013 | Kakande et al. | 370/536 |

OTHER PUBLICATIONS

Croussore, All-Optical Regeneration for Phase-Shift Keyed Optical Communication Systems, PhD Thesis, University of Central Florida, 2007.
Slavik et al, All-optical phase and amplitude regenerator for nextgeneration telecommunications systems, Nat. Photonics, 2010.
Sygletos et al, Phase Locking and Carrier Extraction Schemes for Phase Sensitive Amplification, 2010, Transparent Optical Networks. 2010.
U.S. Appl. No. 13/526,217; pp. 49, Jun. 18, 2012.

\* cited by examiner

*Primary Examiner* — Leslie Pascal
(74) *Attorney, Agent, or Firm* — Baker Botts L.L.P.

(57) ABSTRACT

A method for regenerating and amplifying optical signals includes determining a source optical signal, adding a first pump optical signal and a second pump optical signal to the source optical signal to yield an intermediate optical signal, duplicating the intermediate optical signal to yield a first duplicate signal and a second duplicate signal, phase-shifting the first duplicate signal, passing the phase-shifted first duplicate signal and the second duplicate signal bi-directionally through a nonlinear optical element, and performing degenerate phase-sensitive amplification on the phase-shifted first duplicate signal and the second duplicate signal.

20 Claims, 4 Drawing Sheets

OPTICAL QPSK SIGNAL REGENERATION AND AMPLIFICATION

TECHNICAL FIELD OF THE INVENTION

The present invention relates generally to optical communication networks and, more particularly, to optical quadrature phase-shift-keying signal regeneration and amplification.

BACKGROUND

Telecommunications systems, cable television systems and data communication networks may use optical networks to rapidly convey large amounts of information between remote points. In an optical network, information may be conveyed in the form of optical signals through optical fibers. Optical fibers may comprise thin strands of glass capable of communicating the signals over long distances with very low loss. Optical networks often employ modulation schemes to convey information in the optical signals over the optical fibers. Such modulation schemes may include phase-shift keying ("PSK"), frequency-shift keying ("FSK"), amplitude-shift keying ("ASK"), and quadrature amplitude modulation ("QAM").

In PSK, the information carried by the optical signal may be conveyed by modulating the phase of a reference signal, also known as a carrier wave. The information may be conveyed by modulating the phase of the signal itself using differential phase-shift keying ("DPSK").

In QAM, the information carried by the optical signal may be conveyed by modulating both the amplitude and phase of the carrier wave. PSK may be considered a subset of QAM, wherein the amplitude of the carrier waves are maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK ("BPSK" or "2-PSK") using two phases at 0° and 180° (or 0 and $\pi$) on the constellation diagram; or quadrature PSK ("QPSK", "4-PSK", or "4-QAM") using four phases at 0°, 90°, 180°, and 270° (or 0, $\pi/2$, $\pi$, and $3\pi/2$). Phases in such signals may be offset. Each of 2-PSK and 4-PSK signals may be arranged in one circle on the constellation diagram.

M-PSK signals may also be polarized using techniques such as dual-polarization QPSK ("DP-QPSK"), wherein separate m-PSK signals are multiplexed by orthogonally polarizing the signals.

SUMMARY

In one embodiment, a method for regenerating and amplifying optical signals includes determining a source optical signal, adding a first pump optical signal and a second pump optical signal to the source optical signal to yield an intermediate optical signal, duplicating the intermediate optical signal to yield a first duplicate signal and a second duplicate signal, phase-shifting the first duplicate signal, passing the phase-shifted first duplicate signal and the second duplicate signal bi-directionally through a nonlinear optical element, and performing degenerate phase-sensitive amplification on the phase-shifted first duplicate signal and the second duplicate signal.

In another embodiment, a system for regenerating optical signals includes an input configured to accept a source optical signal, a dual-pump source configured to generate a first pump optical signal and a second pump optical signal, a coupler communicatively coupled to the input and the dual-pump source configured to add the first pump optical signal and the second pump optical signal to the source optical signal to yield an intermediate optical signal, a wavelength selective processor configured to accept the intermediate optical signal, and a nonlinear optical element communicatively coupled at two ends to the wavelength selective processor. The first wavelength selective processor is configured to duplicate the intermediate optical signal to yield a first duplicate signal and a second duplicate signal, phase-shift the first duplicate signal, and send the phase-shifted first duplicate signal and the second duplicate signal through the nonlinear optical element in opposite directions. The nonlinear optical element is configured to perform degenerate phase-sensitive amplification on the phase-shifted first duplicate signal and the second duplicate signal. The wavelength selective processor includes a wavelength selective switch.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
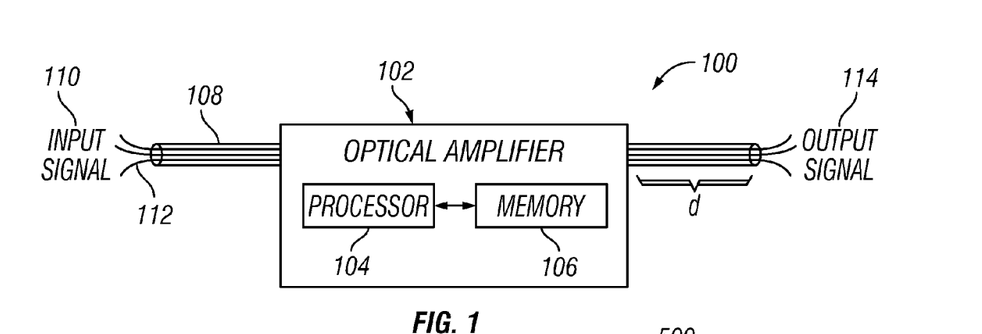
FIG. 1 illustrates an example embodiment of a system configured for optical QPSK signal regeneration and amplification.

FIG. 1 illustrates an example embodiment of a system 100 configured for optical QPSK signal regeneration and amplification. In one embodiment, system 100 may include components with a wavelength-selective processor to conduct optical QPSK signal regeneration and amplification. In a further embodiment, such wavelength selective processors may be reconfigurable. In another embodiment, system 100 may include a bi-directional phase-sensitive amplifier to conduct optical QPSK signal regeneration and amplification. In a further embodiment, such phase-sensitive amplification may be degenerate. The optical signal regeneration and amplification of optical QPSK modulation formats may be conducted by one or more optical amplifiers, such as optical amplifier 102.

Optical amplifier 102 may be configured to regenerate and amplify optical signals in system 100. System 100 may include an input signal 110 to be regenerated and amplified as output signal 114 by optical amplifier 102. Signals may be transmitted in system 100 over an optical network 108, which may include one or more optical fibers 112 of any suitable type. System 100 may include optical amplifier 102 in any suitable portion of system 100 or an optical network, such as in a transmission line between two optical components or in a reconfigurable optical add-drop multiplexer ("ROADM"). Furthermore, optical amplifier 102 may be configured to operate as a stand-alone device or as part of another piece of optical transmission equipment. Optical amplifier 102 may be placed a distance d from a subsequent piece of optical equipment.

Figure 2:
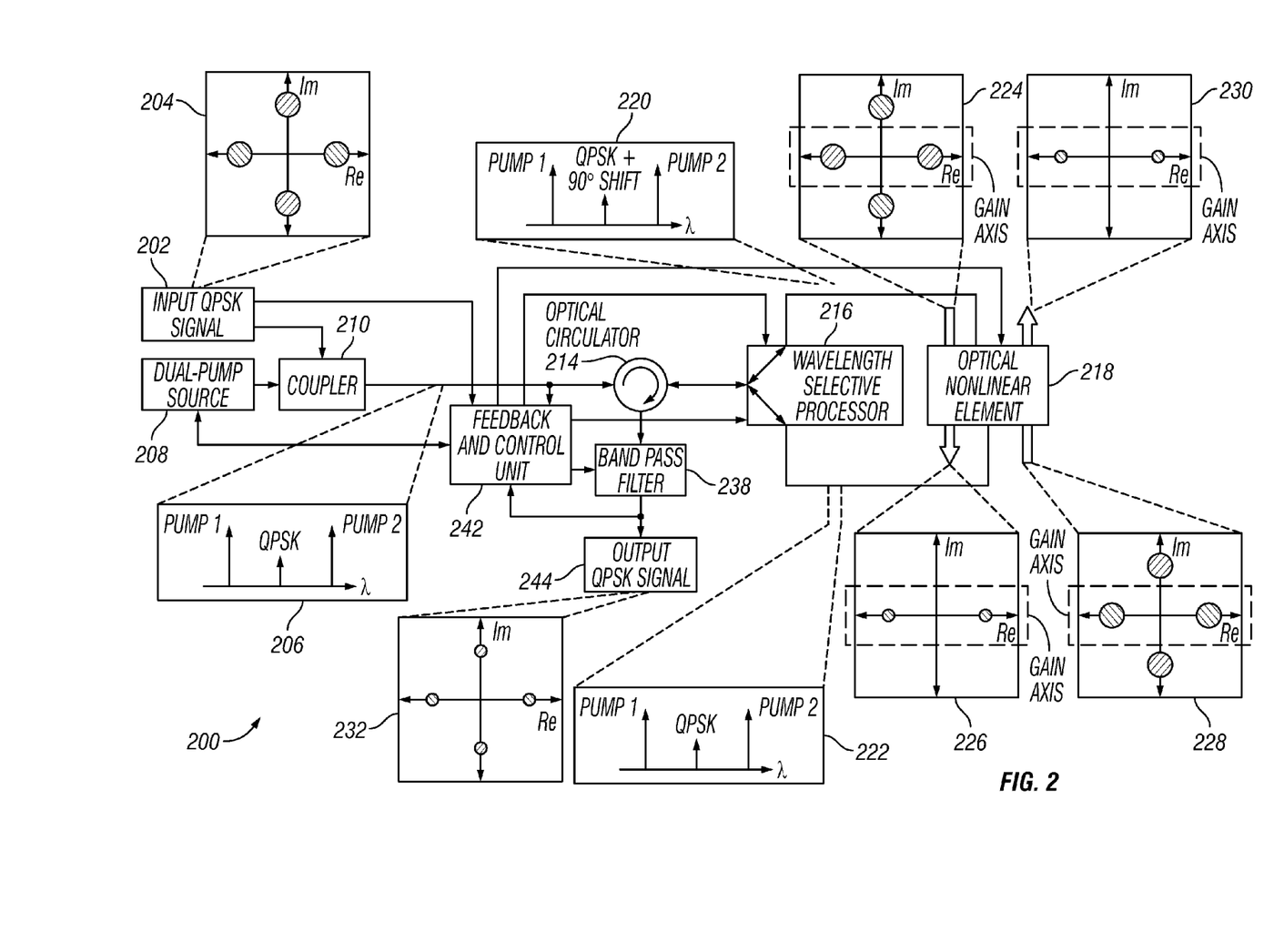
FIG. 2 is an illustration of an example embodiment of an optical amplifier for use with a QPSK input signal.
Figure 3:
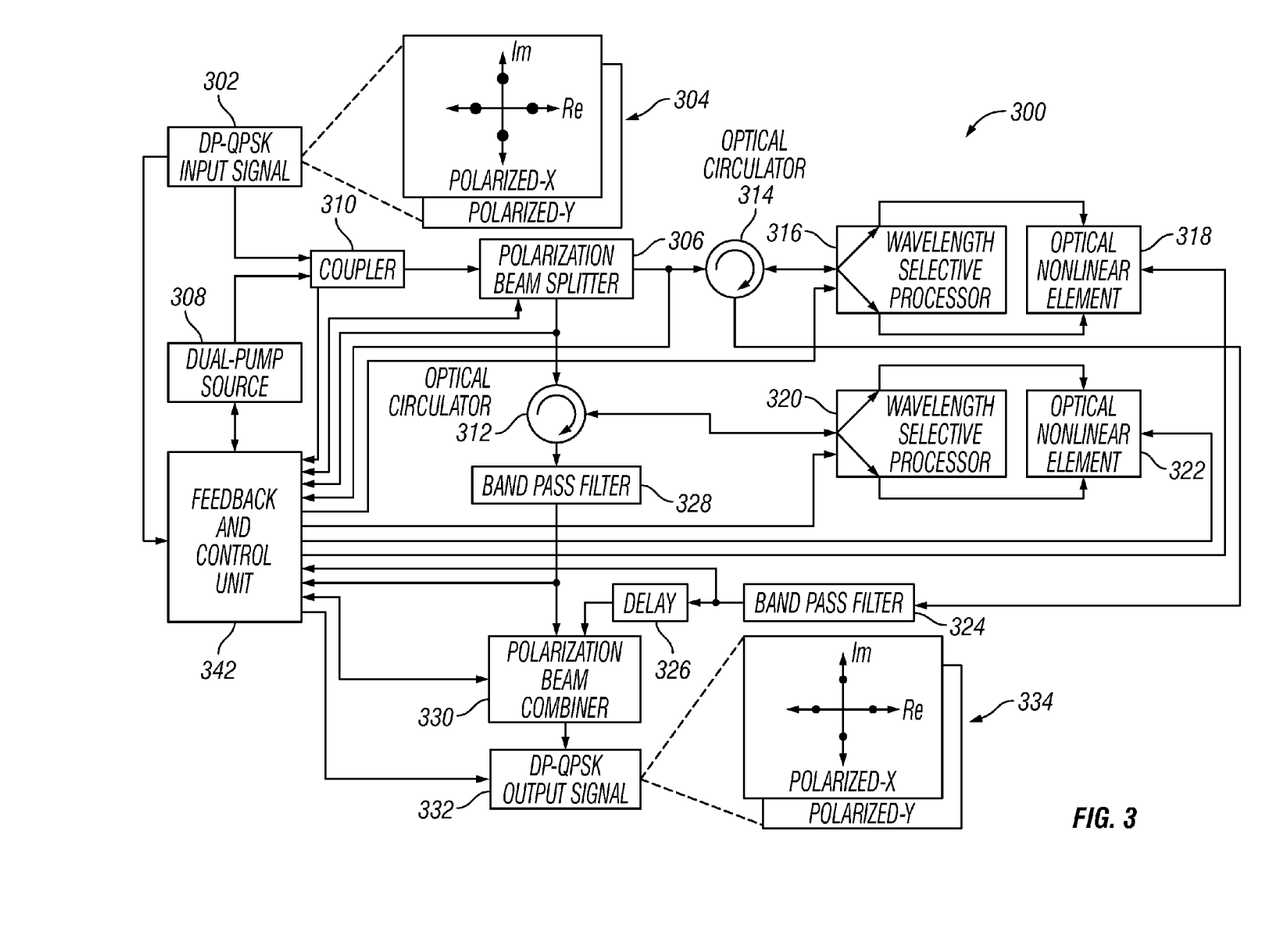
FIG. 3 is an illustration of an example embodiment of an optical amplifier for use with a DP-QPSK signal.
Figure 4:
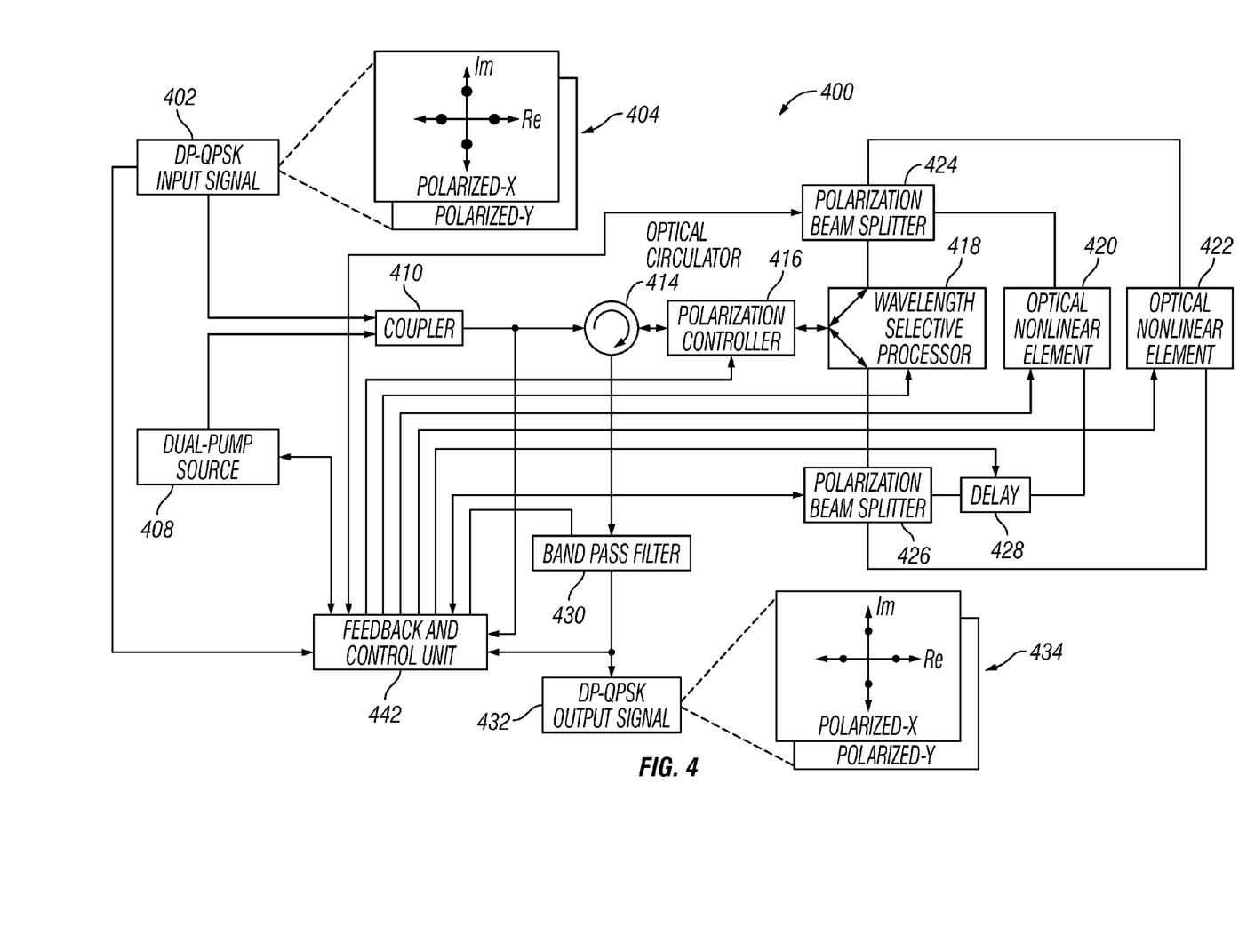
FIG. 4 is an illustration of another example embodiment of an optical amplifier for use with a DP-QPSK signal.

Optical amplifier 102 may include any suitable number and kind of components configured to perform optical signal regeneration and amplification as described herein. Example implementations of all or part of optical amplifier 102 may include amplifiers 200, 300, and 400 as shown in FIGS. 2, 3, and 4, respectively. Optical amplifier 102 may include a processor 104 coupled to a memory 106. In one embodiment, to perform optical signal regeneration and amplification, optical amplifier 102 may include components for configuring optical amplifier 102 to monitor, adjust, and pre-compensate input signals and other system characteristics such as pump signals to adjust signal information such as phase, power and chromatic dispersion. In another embodiment, to perform optical signal regeneration and amplification, optical amplifier 102 may include components for performing dual-pump optical four-wave mixing. In a further embodiment, such four-wave mixing may be accomplished by passing the input signal, or filtered portions thereof, bi-directionally through a nonlinear optical element. In yet another further embodiment, passing such signals bi-directionally may include separately and simultaneously processing the input signal's imaginary and real components in each such direction by passing the signal in a given direction through the nonlinear optical element.

Specifically, optical amplifier 102 may generate pump laser signals, which may be used to create idler signals which are then added to the input signal. The resulting input signal and idler signals may become degenerate after wave mixing. Optical amplifier 102 may be configured to conduct four-wave mixing ("FWM") which amplifies input signal 110 and accepts the symmetric idler signals. The wavelengths of the pump and idler signals may be equidistant (or nearly equidistant) from the wavelength of input signal 110. Optical amplifier 110 may be configured to apply FWM to input signal 110 and to the pump signals and thus reduce the phase noise on the symbols of input signal 110. The equidistant or nearly equidistant wavelengths may include wavelengths that are, for example, perfectly equidistant or approximately equidistant such that overall performance is not impacted significantly. Such approximately equidistant wavelengths may include wavelength differences between the idler signals and input signal 110 that are approximately equal, or wavelength differences between the pump signals and input signal that are approximately equal. In one embodiment, approximately equal wavelength differences may include wavelength differences that vary less than ten percent of in terms of wavelength in relation to the wavelength of input signal 110.

Input signal 110 may include an optical signal modulated through any suitable QPSK or dual-polarization ("DP") QPSK.

Processor 104 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 104 may interpret and/or execute program instructions and/or process data stored in memory 106 to carry out some or all of the operation of optical amplifier 102. Memory 106 may be configured in part or whole as application memory, system memory, or both. Memory 106 may include any system, device, or apparatus configured to hold and/or house one or more memory modules. Each memory module may include any system, device or apparatus configured to retain program instructions and/or data for a period of time (e.g., computer-readable media). Memory 106 may be non-transitory.

Optical network 108 may include one or more optical fibers 112 operable to transport one or more optical signals communicated by components of the optical network 108. Optical network 108 may be, for example, a point-to-point optical network with terminal nodes, a ring optical network, a mesh optical network, or any other suitable optical network or combination of optical networks. Optical network 108 may be used in a short-haul metropolitan network, a long-haul inter-city network, or any other suitable network or combination of networks. The capacity of optical network 108 may include, for example, 100 Gbit/s, 400 Gbit/s, or 1 Tbit/s. Optical fibers 112 may include any suitable type of fiber, such as a Single-Mode Fiber ("SMF"), Enhanced Large Effective Area Fiber ("E-LEAF"), or TrueWave® Reduced Slope ("TW-RS") fiber. Optical network 108 may include devices, such as optical amplifier 102, operable to transmit optical signals over optical fibers 112. Information may be transmitted and received through optical network 108 by modulation of one or more wavelengths of light to encode the information on the wavelength.

In operation, optical amplifier 102 may be operating on optical network 108. Input signal 110 may arrive on optical network 108 through fibers 112. Optical amplifier may regenerate and amplify input signal 110 and output the result as output signal 114.

Some methods of regenerating a signal to overcome phase noise may include optical-electrical-optical ("OEO") regeneration methods. Such methods may include, for example, converting optical signals into electronic signals. Such conversion may occur after demultiplexing. The electronic signals may be switched and then converted back into optical signals, which may then be multiplexed onto optical networks. In one embodiment, optical amplifier 102 may not use OEO regeneration methods. In another embodiment, optical amplifier 102 may regenerate a received signal using optical mechanisms and without converting the information in the optical mechanisms to electronic format.

FIG. 2 is an illustration of an example embodiment of an optical amplifier 200 for use with a QPSK input signal. Optical amplifier 200 may implement fully or in part optical amplifier 102 of FIG. 1.

Optical amplifier 200 may include a mechanism for accepting an input signal such as input QPSK signal 202. The input signal may be communicatively coupled to dual-pump source 208 through coupler 210. Coupler 210 may be configured to couple input QPSK signal 202 and dual-pump source 208 and provide the output to optical circulator 214, which may be communicatively coupled on a first input/output line to a wavelength selective processor 216 and on a second input/output line to a bandpass filter 238. Wavelength selective processor 216 may be communicatively coupled through two outputs to either end of an optical nonlinear element 218. The output of bandpass filter 238 may be communicatively coupled to output QPSK signal 244, which may implement fully or in part output signal 114 of FIG. 1.

Input QPSK signal 202 and output QPSK signal 244 may include, for example, optical signals modulated using QPSK or DP-QPSK.

Optical circulator 214 may include any suitable mechanism for selective routing of inputs and outputs according to the present disclosure. For example, optical circulator 214 may include a plurality of sequentially identified optical input-output ports and may allow light to travel in only one direction. An optical signal entered into a first port will exit the second port, while a signal entering the second port will exit the third port. The sequential identification of the first, second, and third port, and thus the input-output behavior, may be schematically identified with a clockwise or counter-clockwise indicator. In the example of FIG. 2, optical circulator may operate in clockwise fashion such that the input from coupler 210 is output to wavelength selective processor 216, and input from wavelength selective processor 216 is output to bandpass filter 238.

Dual-pump source 208 may include any suitable mechanism for outputting two optical pump signals of given wavelengths and frequencies. Dual-pump source 208 may be implemented with configurable laser sources. The configuration of dual-pump source 208 may be set by a processor of amplifier 200, such as that represented as processor 104 in FIG. 1. In one embodiment, the configuration of dual-pump source 208 may be set by feedback and control unit 242. Dual-pump source 208 may be configured to respond to the specific kind of input QPSK signal 202 received by amplifier 200.

In one embodiment, dual-pump source 208 may be configured to produce two pump signals that are symmetrically located on each side of a signal to be amplified, such as input QPSK signal 202. Each pump signal may be equidistant, or approximately equidistant, from the source signal in terms of wavelength. In another embodiment, each of the pump signals may have exactly the same phase. In a further embodiment, each of the pump signals may have a phase of zero. An example output of coupling the dual-pump signals and the original source signal may be illustrated in diagram 206. This output may be routed to wavelength selective processor 216 by optical circulator 214. In one example, each pump of dual-pump source 208 may have a 200-mW power and 350-GHz spacing.

Wavelength selective processor 216 may include one or more wavelength selective switches configured to perform optical switching. Such wavelength selective switches may be implemented by any suitable mechanism, including optical components, for conducting such optical switching. Furthermore, wavelength selective processor 216 may include modules, circuitry, or software configured to adjust phase and power levels of components of signals. In addition, wavelength selective processor 216 may include automation software configured to control the operation of wavelength selective switches. Any suitable automation software may be used. The automation software may include instructions resident upon a computer-readable medium for execution by a processor. Wavelength selective processor 216 may include a microprocessor, microcontroller, DSP, ASIC, or any other digital or analog circuitry for executing the instructions resident upon a computer-readable medium or for otherwise performing control of wavelength selective switches.

Wavelength selective processor 216 may be configured to divide its input into two signals such that imaginary and real portions of input QPSK signal 202 may be divided and four-wave-mixing performed on each simultaneously. To perform such four-wave mixing, wavelength selective processor 216 may be configured to divide its input into two signals wherein one such signal may include input QPSK signal 202 phase-shifted by 90°. For example, wavelength selective processor 216 may produce the output shown in diagram 220 onto one branch of input to optical nonlinear element 218—including input QPSK signal 202 phase-shifted by 90° and the pump signals—and produce the output shown in diagram 222 onto the other branch of input to optical nonlinear element 218—including input QPSK signal 202 and the pump signals.

Wavelength selective processor 216 may be configurable to handle a variety of types of high-level modulation formats, such as QPSK or DP-QPSK. To conduct such handling, wavelength selective processor 216 may be configured to determine the type of signal to be handled through, for example, analyzing input signals, referencing user settings, referencing system settings, or receiving input from feedback and control unit 242. Furthermore, wavelength selective processor 216 may be configured to filter unused idler signals, based on the type of signal in use.

Optical nonlinear element 218 may be configured to bi-directionally amplify and regenerate signals passing through either end of optical nonlinear element 218 using four-wave mixing. Such bi-directional amplification may be performed on signals passing simultaneously through optical nonlinear element 218 in each direction. In one embodiment, any nonlinear element that can support bi-directional propagation and nonlinear processing may be used to implement optical nonlinear element 218. For example, optical nonlinear element 218 may include an optical, highly nonlinear fiber ("HNLF") of length of two hundred meters, nonlinear coefficient ($\gamma=9.2$ (1/W·km)), dispersion slope ($S=0.018$ ps/km/nm$^2$), and zero-dispersion wavelength ("ZDW") at 1550 nm. In another example, optical nonlinear element 218 may include waveguides configured to produce the desired output. In yet other examples, optical nonlinear element 218 may include a silicon waveguide, III-V waveguide, or periodically poled Lithium Niobate ("PPLN").

The input into optical nonlinear element 218 from wavelength selective processor may be illustrate by diagrams 220, 222 as discussed above as well as diagrams 224, 228. Diagrams 224, 228 illustrate the imaginary and real components of input QPSK signal 202 that have been included by wavelength selective processor 216. The output of optical nonlinear element 218 may be illustrated in diagrams 226, 230. Diagram 224 may illustrate the real and imaginary components of diagram 204 as they have been phase-shifted. Diagram 228 may illustrate the real and imaginary components of diagram 204 has it was originally provided to wavelength selective processor 216. In diagram 226, the imaginary component of input QPSK signal 202 (phase-shifted to the real axis of the input signal illustrated in diagram 202) has been regenerated and amplified as a result of its input—the combination of input QPSK signal 202 phase-shifted by 90° and the pump signals—being passed through optical nonlinear element 218. In diagram 230, the real component of input QPSK signal 202 has been regenerated and amplified as a result of its input—the combination of input QPSK signal 202 and the pump signals—being passed through optical nonlinear element 218.

The combination of wavelength selective processor 216 and optical nonlinear element 218 may be bi-directional in that signals pass from wavelength selective processor 216 to optical nonlinear element 218 and back to wavelength selective processor 216 in both directions (clockwise and counterclockwise). By performing separate processing of imaginary and real components of input QPSK signal 202, optical amplifier 200 may avoid crosstalk or path mismatch between the components. Further, by performing the processing bi-directionally, optical amplifier 200 may achieve hardware efficiency by lessening the need for additional optical nonlinear elements.

Wavelength selective processor 216 may be configured to couple the outputs of optical nonlinear element 218 and selectively block or filter the pump signals. Wavelength selective processor 216 may be configured to send the resultant signal to bandpass filter 238 by way of optical circulator 214.

Bandpass filter 238 may be configured to remove the idler signals from the result of FWM by only allowing signals with the wavelength of the original input QPSK signal 202 to pass. Bandpass filter 238 may be implemented in any suitable manner, such as with digital or analog circuitry. Bandpass filter 238 may be configured to generate output QPSK signal 244. The result of optical amplification and regeneration in output QPSK signal 244 may be illustrated in diagram 232, wherein the noise present in input QPSK signal 202 as illustrated in diagram 204 has been reduced.

Feedback and control unit 242 may be configured to monitor performance of optical amplifier 200 and its signals. Such monitoring may be conducted in real-time and may include, for example, information regarding input QPSK signal 202, signals from dual-pump source 208, or output QPSK signal 244. Such information may include, for example, wavelength, power, residual chromatic dispersion, and optical signal-to-noise ratio. Based on such information, feedback and control unit 242 may be configured to adjust or control the operation of various portions of optical amplifier 200 to enhance or optimize performance of optical amplifier 200. Such portions may include, for example, dual-pump source 208, wavelength selective processor 216, and input QPSK signal 202. Feedback and control unit 242 may be configured to adjust the phase, power, and chromatic dispersion of signals in such portions before passing signals through optical nonlinear element 218. Control of dual-pump source 208 may be made to match pump signals to be nearly equidistant in wavelength distance from input QPSK signal 202. Wavelength-selective processor 216 may be adjusted to pre-compensate its input signals for the input signals' residual chromatic dispersion or for dispersion slope of HNLF resident within optical nonlinear element 218. Further, wavelength-selective processor 216 may be configured to adjust the phase level of its input signals in order to increase or optimize amplification and regeneration.

In operation, input QPSK signal 202 may be received by optical amplifier 200 and communicatively coupled to the output of dual-pump source 208. Dual-pump source 208 may output two pump signals with wavelengths equidistant from the wavelength of input QPSK signal 202. The wavelength, power, residual chromatic dispersion, and optical signal-to-noise ratio of input QPSK signal 202 and the pump signals may be monitored by feedback and control unit 242. Feedback and control unit 242 may adjust the phase, power, and chromatic dispersion of input QPSK signal 202 and the pump signals to maximize or optimize amplification and regeneration.

The resultant combination of input QPSK signal 202 and the pump signals may be routed by optical circulator 214 to wavelength selective processor 216. Wavelength selective processor 216 may pre-compensate its input signals for the signals' residual chromatic dispersion, pre-compensate its input signals for the dispersion slope of any HNLF or other components of optical nonlinear element 218, or adjust its input signals' phase levels in order to maximize or optimize amplification and regeneration.

Wavelength selective processor 216 may duplicate its input signals and, for one such duplicate, selectively shift the phase of the portion corresponding to input QPSK signal 202 by 90°. Wavelength selective processor 216 may output one such signal to a first terminal of optical nonlinear element 218 and the other such signal to a second terminal of optical nonlinear element 218.

Optical nonlinear element 218 may conduct amplification and regeneration on each received signal. The amplification may include phase-sensitive amplification. The phase-sensitive amplification may be degenerate. In addition, optical nonlinear element 218 may conduct four-wave mixing on each received signal. Such four-wave mixing may cause the regeneration and amplification of the signal. For the received signal including input QPSK signal 202 phase-shifted by 90°, optical nonlinear element 218 may amplify and regenerate the real components of the received signal. For the received signal including input QPSK signal 202 without the phase shifting, optical nonlinear element 218 may amplify and regenerate the imaginary components of the received signal. Optical nonlinear element 218 may send the resultant signals back to wavelength selective processor 216.

Wavelength selective processor 216 may recombine the results received from optical nonlinear element 218 and send the resultant signals to bandpass filter 238 through optical circulator 214. Bandpass filter 238 may remove the pump signals from the received signal and send the result as output QPSK signal 244.

FIG. 3 is an illustration of an example embodiment of an optical amplifier 300 for use with a DP-QPSK signal. Optical amplifier 300 may implement fully or in part optical amplifier 102 of FIG. 1. Optical amplifier 300 may be configured to regenerate and amplify QPSK modulated signals that have been further modulated with dual polarizations. Further, optical amplifier 300 may be configured to split an input signal such as DP-QPSK input signal 302 into x-polarization and y-polarization components and process each such polarization using bi-directional phase sensitive amplification. The implementation and operation of optical amplifier 300 may be otherwise similar to optical amplifier 200 of FIG. 2. Coupler 310, dual-pump source 308, optical circulators 312, 314, wavelength selective processors 316, 320, optical nonlinear elements 318, 322, bandpass filters 324, 328, and feedback and control unit 342 may be implemented wholly or in part by or in similar fashion to coupler 210, dual-pump source 208, optical circulator 214, wavelength selective processor 216, optical nonlinear element 218, bandpass filter 238, and feedback and control unit 242, respectively, of FIG. 2.

Optical amplifier 300 may include a mechanism for accepting an input signal such as input DP-QPSK signal 302. The input signal may be communicatively coupled to dual-pump source 308 through coupler 310. Coupler 310 may be configured to couple input DP-QPSK signal 302 and dual-pump source 308 and provide the output to a polarization beam splitter 306.

Polarization beam splitter 306 may be configured to split its input signal according to x-polarizations and y-polarizations. For example, DP-QPSK input signal 302 may include an x-polarization and a y-polarization component as illustrated in diagram 304. Thus, polarization beam splitter 306 may be configured to output the x-polarization of the combination of DP-QPSK input signal 302's x-polarization and the pump signals and to output the polarization of the combination of DP-QPSK input signal 302's y-polarization and the pump signals. Polarization beam splitter 306 may be configured to output each polarization to a different amplification and regeneration stage. Each such amplification and regeneration stage may be implemented in similar fashion to the combination of optical circulator 214, wavelength selective processor 216, optical nonlinear element 218, and bandpass filter 238 as illustrated in FIG. 2. Polarization beam splitter 306 may be implemented in any suitable manner for splitting its input signals into x-polarization and y-polarization components.

In one embodiment, polarization beam splitter 306 may be configured to pass the resultant x-polarization signal to optical circulator 314 and the resultant y-polarization signal to optical circulator 312. In another embodiment, polarization beam splitter 306 may be configured to pass the resultant y-polarization signal to optical circulator 314 and the resultant x-polarization signal to optical circulator 312.

The configuration, operation, and implementation of optical circulator 314, wavelength selective processor 316, optical nonlinear element 318, and bandpass filter 324 may be performed in similar fashion to the configuration, operation, and implementation of optical circulator 214, wavelength selective processor 216, optical nonlinear element 218, and bandpass filter 238 of FIG. 2. Thus, optical circulator 314, wavelength selective processor 316, optical nonlinear element 318, and bandpass filter 324 may be configured to amplify and regenerate, through bi-directional phase-sensitive amplification, an x-polarization or y-polarization of input DP-QPSK signal 302. Optical circulator 314, wavelength selective processor 316, optical nonlinear element 318, and bandpass filter 324 may output an x-polarization or y-polarization of a regenerated and amplified signal. Optical amplifier 300 may include a delay 326 to correct for resulting behavior from polar-specific operations such as drift.

The configuration, operation, and implementation of optical circulator 312, wavelength selective processor 320, optical nonlinear element 322, and bandpass filter 328 may be performed in similar fashion to the configuration, operation, and implementation of optical circulator 214, wavelength selective processor 216, optical nonlinear element 218, and bandpass filter 238 of FIG. 2. Thus, optical circulator 312, wavelength selective processor 320, optical nonlinear element 322, and bandpass filter 328 may be configured to amplify and regenerate, through bi-directional phase-sensitive amplification, an x-polarization or y-polarization of input DP-QPSK signal 302. Optical circulator 312, wavelength selective processor 320, optical nonlinear element 322, and bandpass filter 328 may output an x-polarization or y-polarization of a regenerated and amplified signal. Accordingly, optical amplifier 300 may include a delay 326 to correct for resulting behavior from polar-specific operations such as drift.

Polarization beam combiner 330 may be configured to receive the output from bandpass filter 328 and bandpass filter 324 and recombine the x-polarization and y-polarization signals that have been amplified and regenerated. Further, polarization beam combiner 330 may be configured to output DP-QPSK output signal 332. The result of bi-directional amplification and regeneration of DP-QPSK input signal 302 may be illustrated in diagram 334, wherein noise in DP-QPSK input signal 302 as shown in diagram 304 has been reduced.

Feedback and control unit 342 may be configured to monitor performance of optical amplifier 300 and its signals. Such monitoring may be conducted in real-time and may include, for example, information regarding input DP-QPSK signal 302, signals from dual-pump source 308, output of polarization beam splitter 306, output of bandpass filter 328, or output of bandpass filter 324. Such information may include, for example, wavelength, power, residual chromatic dispersion, and optical signal-to-noise ratio. Based on such information, feedback and control unit 342 may be configured to adjust or control the operation of various portions of optical amplifier 300 to enhance or optimize performance of optical amplifier 300. Such portions may include, for example, dual-pump source 308, wavelength selective processors 316, 320, input DP-QPSK signal 302, polarization beam splitter 306, and polarization beam combiner 330. Feedback and control unit 342 may be configured to adjust the phase, power, and chromatic dispersion of signals in such portions before passing signals through optical nonlinear elements 318,322. Control of dual-pump source 308 may be made to match pump signals to be nearly equidistant in wavelength distance from input DP-QPSK signal 302. Wavelength-selective processors 316, 320 may be adjusted to pre-compensate their input signals for the input signals' residual chromatic dispersion or for dispersion slope of HNLF resident within optical nonlinear elements 318, 322. Further, wavelength-selective processors 316, 320 may be configured to adjust the phase level of its input signals in order to increase or optimize amplification and regeneration.

In operation, DP-QPSK input signal 302 may be received by optical amplifier 300 and communicatively coupled to dual-pump source 308. Dual-pump source 308 may output two pump signals with wavelengths equidistant from the wavelength of input DP-QPSK signal 302. The wavelength, power, residual chromatic dispersion, and optical signal-to-noise ratio of input QPSK signal 302 and the pump signals may be monitored by feedback and control unit 342. Feedback and control unit 342 may adjust the phase, power, and chromatic dispersion of input DP-QPSK signal 302 and the pump signals to maximize or optimize amplification and regeneration.

The resultant signal may be split into x-polarization and y-polarization signals by polarization beam splitter 306. In one embodiment, the x-polarization of the resultant signal may be routed by optical circulator 314 to wavelength selective processor 316 and the y-polarization of the resultant signal may be routed by optical circulator 312 to wavelength selective processor 320. In another embodiment, the y-polarization of the resultant signal may be routed by optical circulator 314 to wavelength selective processor 316 and the x-polarization of the resultant signal may be routed by optical circulator 312 to wavelength selective processor 320.

Wavelength selective processors 316, 320 may pre-compensate their input signals for the signals' residual chromatic dispersion, pre-compensate their input signals for the dispersion slope of any HNLF or other components of optical nonlinear elements 318, 322, or adjust their input signals' phase levels in order to maximize or optimize amplification and regeneration.

Wavelength selective processors 316, 320 may duplicate their input signals and, for one such duplicate, selectively shift the phase of the portion corresponding to input DP-QPSK signal 302 by 90°. Wavelength selective processors 316, 320 may each output one such signal to a first terminal of optical nonlinear elements 318, 322, respectively, and the other such signal to a second terminal of optical nonlinear elements 318, 322, respectively.

Optical nonlinear elements 318, 322 may each conduct amplification and regeneration on each received signal. The amplification may include phase-sensitive amplification. The phase-sensitive amplification may be degenerate. In addition, optical nonlinear elements 318, 322 may conduct four-wave mixing on each received signal. Such four-wave mixing may cause the regeneration and amplification of the signal. For the received signals including input DP-QPSK signal 302 phase-shifted by 90°, optical nonlinear elements 318, 322 may amplify and regenerate the real components of the received signals. For the received signals including input DP-QPSK signal 302 without the phase shifting, optical nonlinear elements 318, 322 may amplify and regenerate the imaginary components of the received signals. Optical nonlinear elements 318, 322 may send the resultant signals back to wavelength selective processors 316, 320, respectively.

Wavelength selective processors 316, 320 may recombine the results received from optical nonlinear elements 318, 322, respectively, and send the resultant signals to bandpass filters 328, 324 through optical circulators 314, 312, respectively. Bandpass filters 328 may remove the pump signals from the received signals and send the results to polarization beam combiner 330. Bandpass filter 324 may remove the pump signals from the received signals and send the results to delay 326. Delay 326 may compensate for conditions such as drift introduced between the x-polarization and y-polarization signals. Delay 326 may send the resulting signal to polarization beam combiner 330. Polarization beam combiner 330 may reassemble the amplified and regenerated x-polarization and y-polarization components into DP-QPSK output signal 332.

FIG. 4 is an illustration of another example embodiment of an optical amplifier 400 for use with a DP-QPSK signal. Optical amplifier 400 may implement fully or in part optical amplifier 102 of FIG. 1. Optical amplifier 400 may be configured to produce the same or similar results as optical amplifier 300 of FIG. 3 but may vary from optical amplifier 300 in terms of its components. Optical amplifier 400 may be configured to regenerate and amplify QPSK modulated signals that have been further modulated with dual polarizations. Further, optical amplifier 400 may be configured to split an input signal such as DP-QPSK input signal 402 into x-polarization and y-polarization components and process each such polarization using bi-directional phase sensitive amplification.

DP-QPSK input signal 402, coupler 410, dual-pump source 408, optical circulator 414, wavelength selective processor 418, polarization beam splitters 424, 426, optical nonlinear elements 420, 422, bandpass filter 430, feedback and control unit 442, and DP-QPSK output signal 432 may be implemented wholly or in part by or in similar fashion to DP-QPSK input signal 302, coupler 310, dual-pump source 308, optical circulators 314, 312, wavelength selective processors 316, 320, polarization beam splitter 306, optical nonlinear elements 318, 320, bandpass filters 328, 324, feedback and control unit 342, and DP-QPSK output signal 332 respectively, of FIG. 3.

Optical amplifier 400 may be configured to accept DP-QPSK input signal 402, which may include an x-polarization and a y-polarization component as illustrated in diagram 404. The input signal may be communicatively coupled to dual-pump source 408 through coupler 410. Coupler 410 may be configured to couple input DP-QPSK signal 402 and dual-pump source 408 and provide the output to a polarization controller 416 optical via optical circulator 414.

Polarization controller 416 may be configured to adjust the x-polarization and y-polarization components of its input signals to maximize or increase the effects of amplification and regeneration to be performed by, for example, optical nonlinear elements 420, 422. Such adjustments may include a polarization-shifting of either the x-polarization and y-polarization components. Furthermore, polarization controller 416 may be configured to adjust such components after they have been amplified and regenerated. Polarization controller 416 may be implemented in any suitable manner to perform such adjustments.

Polarization controller 416 may be configured to send its resulting signals to wavelength selective processor 418. Wavelength selective processor 418 may be configured to duplicate its input signals, phase-shift a portion corresponding to DP-QPSK input signal 402 of one such resulting signal, and send one resulting signal to polarization beam splitter 424 and the other such resulting signal to polarization beam splitter 426. The phase-shifted portion corresponding to DP-QPSK input signal 402 may be phase-shifted by 90°. In one embodiment, wavelength selective process 418 sends the phase-shifted signal to polarization beam splitter 424 and the non-phase-shifted signal to polarization beam splitter 426. In another embodiment, wavelength selective processor 418 sends the phase-shifted signal to polarization beam splitter 426 and the non-phase-shifted signal to polarization beam splitter 424.

Polarization beam splitters 426, 424 may each be configured to split its received signal into x-polarization and y-polarization components. In one embodiment, polarization beam splitters 426, 424 may be configured to route the resulting x-polarization components to optical nonlinear element 420 and the resulting y-polarization components to optical nonlinear element 422. In another embodiment, polarization beam splitters 426, 424 may be configured to route the resulting y-polarization components to optical nonlinear element 420 and the resulting x-polarization components to optical nonlinear element 422.

The configuration, operation, and implementation of wavelength selective processor 418 and optical nonlinear elements 420, 422 may otherwise be performed in similar fashion to the configuration, operation, and implementation of, for example, wavelength selective processor 316 and optical nonlinear element 318 or of wavelength selective processor 320 and optical nonlinear element 322 of FIG. 3. Thus, wavelength selective processor 418 and optical nonlinear elements 420, 422 may be configured to amplify and regenerate, through bi-directional phase-sensitive amplification, an x-polarization and y-polarization of input DP-QPSK signal 402. Optical amplifier 400 may include a delay 426 configured to correct for resulting behavior from polar-specific operations such as drift.

Wavelength selective processor 418 may be configured to receive and combine the resulting amplified and regenerated signals from an individual branch of execution corresponding to optical nonlinear element 420 or optical nonlinear element 422. Such a set of amplified and regenerated signals may correspond to an individual set of one of the x-polarization or y-polarization components. Wavelength selective processor 418 or polarization controller 416 may be configured to recombine the resulting amplified and regenerated x-polarization and y-polarization components together. Polarization controller 416 may be configured to adjust the x-polarization or y-polarization components as necessary to account for effects such as drift or signal manipulation. Polarization controller 416 may be configured to send the resultant signals to bandpass filter 430 through optical circulator 414.

Bandpass filter 430 may be configured to selectively remove pump or other signals from its received signals and to output DP-QPSK output signal 432. The result of bi-directional amplification and regeneration of DP-QPSK input signal 402 may be illustrated in diagram 434, wherein noise in DP-QPSK input signal 402 as shown in diagram 404 has been reduced.

Feedback and control unit 442 may be configured to monitor performance of optical amplifier 400 and its signals. Such monitoring may be conducted in real-time and may include, for example, information regarding input DP-QPSK signal 402, signals from dual-pump source 408, output of polarization beam splitters 424, 426, or output of bandpass filter 430. Such information may include, for example, wavelength, power, residual chromatic dispersion, and optical signal-to-noise ratio. Based on such information, feedback and control unit 442 may be configured to adjust or control the operation of various portions of optical amplifier 400 to enhance or optimize performance of optical amplifier 400. Such portions may include, for example, dual-pump source 408, wavelength selective processor 418, polarization beam splitters 424, 426, polarization controller 416, delay 428, and bandpass filter 430. Feedback and control unit 442 may be configured to adjust the phase, power, and chromatic dispersion of signals in such portions before passing signals through optical nonlinear elements 420, 422. Control of dual-pump source 408 may be made to match pump signals to be nearly equidistant in wavelength distance from input DP-QPSK signal 402. Wavelength-selective processor 418 may be adjusted to pre-compensate their input signals for the input signals' residual chromatic dispersion or for dispersion slope of HNLF resident within optical nonlinear elements 420, 422. Further, wavelength-selective processor 418 may be configured to adjust the phase level of its input signals in order to increase or optimize amplification and regeneration. Polarization controller 418 and polarization beam splitters 424, 426 may be adjusted to maximize or increase signal regeneration and amplification by subsequently adjusting x-polarization or y-polarization components of signals. Bandpass filter 430 may be adjusted to selectively filter the output of dual-pup source 408.

In operation, DP-QPSK input signal 402 may be received by optical amplifier 400 and communicatively coupled to dual-pump source 408. Dual-pump source 408 may output two pump signals with wavelengths equidistant from the wavelength of input DP-QPSK signal 402. The wavelength, power, residual chromatic dispersion, and optical signal-to-noise ratio of input QPSK signal 402 and the pump signals may be monitored by feedback and control unit 442. Feedback and control unit 442 may adjust the phase, power, and chromatic dispersion of input DP-QPSK signal 402 and the pump signals to maximize or optimize amplification and regeneration.

The resultant signal may be routed to polarization controller 416 through optical circulator 414. The x-polarization and y-polarization components of the signal may be adjusted by polarization controller 416, which may receive input for such adjustments from feedback and control unit 442. Polarization controller 416 may send the resulting signals to wavelength selective processor 418.

Wavelength selective processor 418 may pre-compensate its input signals for the signals' residual chromatic dispersion, pre-compensate their input signals for the dispersion slope of any HNLF or other components of optical nonlinear elements 420, 422, or adjust their input signals' phase levels in order to maximize or optimize amplification and regeneration.

Wavelength selective processor 418 may duplicate its input signals and, for one such duplicate, selectively shift the phase of the portion corresponding to input DP-QPSK signal 402 by 90°. Wavelength selective processor 418 may output one such signal to a first polarization beam splitter 424 to then be output to a first terminal of optical nonlinear elements 420, 422, respectively, and the other such signal to a second polarization beam splitter 426 to then be output to a second terminal of optical nonlinear elements 420, 424, respectively.

Polarization beam splitters 424, 426 may split their received signals into x-polarization and y-polarization components. In one embodiment, polarization beam splitter 424 may route the x-polarization component of its received signal to a first terminal of optical nonlinear element 420 and the y-polarization component of its received signal to a first terminal optical nonlinear element 422, and polarization beam splitter 426 may route the x-polarization component of its received signal to a second terminal of optical nonlinear element 420 and the y-polarization component of its received signal to a second terminal optical nonlinear element 422. In another embodiment, polarization beam splitter 424 may route the y-polarization component of its received signal to a first terminal of optical nonlinear element 420 and the x-polarization component of its received signal to a first terminal optical nonlinear element 422, and polarization beam splitter 426 may route the y-polarization component of its received signal to a second terminal of optical nonlinear element 420 and the x-polarization component of its received signal to a second terminal optical nonlinear element 422.

Optical nonlinear elements 420, 422 may each conduct amplification and regeneration on each received signal. The amplification may include phase-sensitive amplification. The phase-sensitive amplification may be degenerate. In addition, optical nonlinear elements 420, 422 may conduct four-wave mixing on each received signal. Such four-wave mixing may cause the regeneration and amplification of the signal. For the received signals including input DP-QPSK signal 402 phase-shifted by 90°, optical nonlinear elements 420, 422 may amplify and regenerate the real components of the received signals. For the received signals including input DP-QPSK signal 402 without the phase shifting, optical nonlinear elements 420, 422 may amplify and regenerate the imaginary components of the received signals. Optical nonlinear elements 420, 422 may send the resultant signals back to wavelength selective processor 418 respectively. Delay 428 may be used to delay the x-polarization or the y-polarization components in order to compensate for any length mismatch between the two paths to nonlinear elements 420, 422.

Wavelength selective processor 418 may recombine the results received from optical nonlinear elements 420, 422 resultant signals to polarization controller 416, which may send the result to bandpass filter 430 through optical circulator 414 Bandpass filter 430 may remove the pump signals from the received signals. Bandpass filter 430 may produce DP-QPSK output signal 432.

Figure 5:
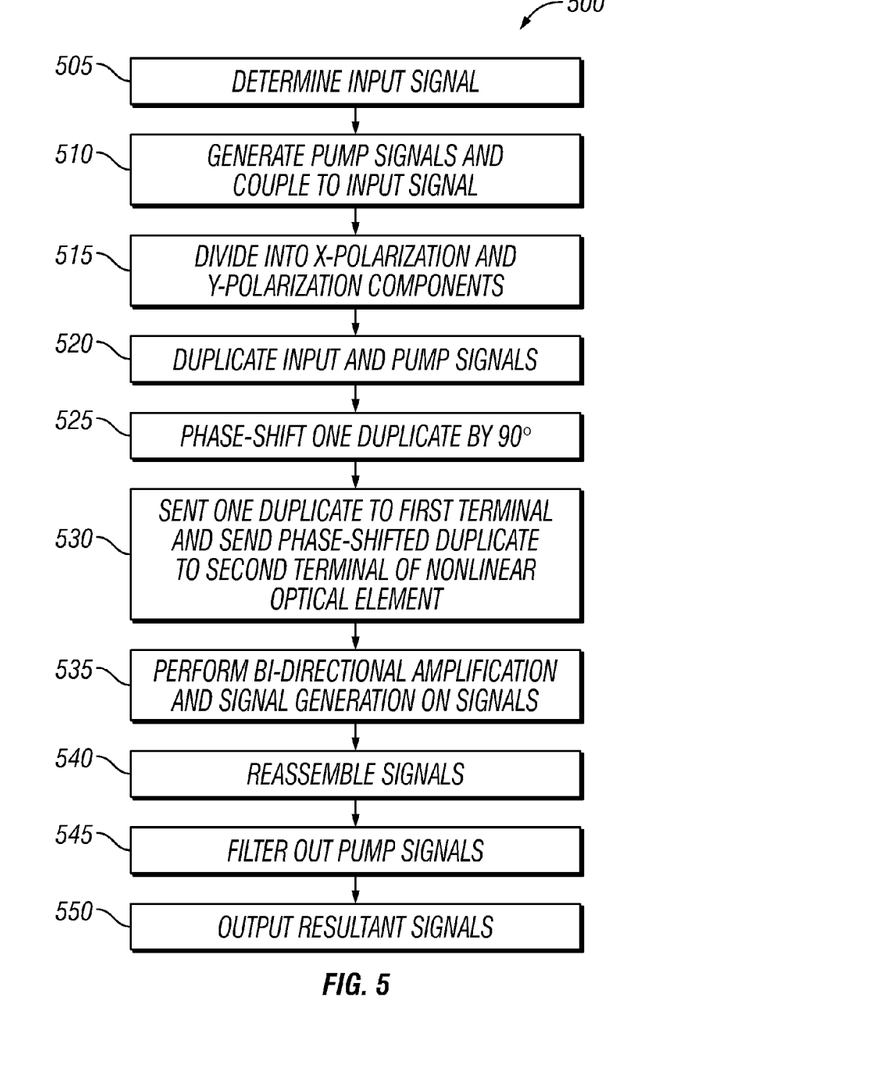
FIG. 5 is an example embodiment of a method for optical signal regeneration and amplification of signals modulated with QPSK or DP-QPSK modulation formats.

FIG. 5 is an example embodiment of a method 500 for optical signal regeneration and amplification of signals modulated with QPSK or DP-QPSK modulation formats. Method 500 may include using wavelength selective processors and phase-sensitive amplification.

In step 505, a signal to be regenerated and amplified may be determined. The signal may be modulated using, for example, QPSK or DP-QPSK modulation techniques. Compensation for noise and errors in input signal and in the equipment used to regenerate and amplify the input signal may be determined and applied. Determinations of equipment of operation of equipment necessary to regenerate and amplify the signal may be made. Based on the determination of the signal to be regenerated and amplified through, for example, analysis of the signal, software settings, or user settings, the physical embodiment of the system or optical amplifier may be programmed to handle the type of signal. For example, the pump signals generated and selected in step 510 or whether to engage beam splitters and combiners for a dual-polarized QPSK signal may be based upon such programming.

In step 510, a dual-pump signal may be generated and communicatively coupled to the input signal. The pump signals may have a wavelength near the source signal. The difference in wavelength between the each of the pump signals and the source signal may be the same or nearly the same. In one embodiment, the first pump signal may have a shorter wavelength than the input signal while the second pump signal may have a longer wavelength than the input signal. The pump signals may lie symmetrically around the input signal in terms of wavelength. The input signal may be added to the first pump signal. In one embodiment, the pump signal may have no phase elements.

In step 515, if the input signal is a DP-QPSK signal, the input signal and pump signals may be divided into x-polarization and y-polarization components. Each such component may be handled, for example, by parallel performance of steps 520-540. In one embodiment, step 515 may be performed before operation of step 520 to perform duplication of input signals and phase-shifting of one such copy. In another embodiment, step 515 may be performed after operation of step 520. Processing of x-polarization and y-polarization components may be performed in parallel using, for example, the configurations shown in FIG. 3 or 4. Delay may be applied to the x-polarization or y-polarization components to compensate for effects such as drift or path mismatch.

In step 520, the input signal and pump signals may be duplicated. In step 525, one such signal may be phase-shifted by 90°. In step 530, one such resulting copy may be may be sent to a first terminal of an optical nonlinear element and the other copy may be sent to a second terminal of the optical nonlinear element.

In step 535, the optical nonlinear element, or other suitable mechanism, may perform bi-directional amplification and signal generation on the two signals. The optical nonlinear element may utilize FWM or degenerate phase-sensitive amplification. The resulting signals may include an amplified signal with reduced phase and amplitude noise. The processing of the input signal that has been phase-shifted may be applicable to amplify and regenerate the real components of the input signal. The processing of the input signal that has not been phase-shifted may be applicable to amplify and regenerate the imaginary components of the input signal.

In step 540, the signals may be reassembled. Such reassembly may include reassembling the real and imaginary portions of the amplified and regenerated signal or reassembling the x-polarization and y-polarizations after amplification and regeneration. In step 545, the pump signals may be filtered out of the resulting signal. In step 550, the resulting signal may be output.

Method 500 may be implemented using the system and optical amplifiers of FIGS. 1-4, or any other system or device operable to implement method 500. As such, the preferred initialization point for method 500 and the order of the steps comprising method 500 may depend on the implementation chosen. In some embodiments, some steps may be optionally omitted, repeated, or combined. In certain embodiments, method 500 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as other tangible, non-transitory media; and/or any combination of the foregoing.

Although the present invention has been described with several embodiments, various changes and modifications may be suggested to one skilled in the art. It is intended that the present invention encompass such changes and modifications as fall within the scope of the appended claims.

What is claimed is:

1. A method for regenerating and amplifying optical signals, comprising:
   determining a source optical signal;
   adding a first pump optical signal and a second pump optical signal to the source optical signal to yield an intermediate optical signal;
   duplicating the intermediate optical signal to yield a first duplicate signal and a second duplicate signal;
   phase-shifting the first duplicate signal;
   passing the phase-shifted first duplicate signal and the second duplicate signal bi-directionally through a first nonlinear optical element; and
   performing degenerate phase-sensitive amplification on the phase-shifted first duplicate signal and the second duplicate signal.

2. The method of claim 1, wherein:
   the difference between a wavelength of the first pump optical signal and a wavelength of the source optical signal comprises a first wavelength distance;
   the difference between a wavelength of the second pump optical signal and a wavelength of the source optical signal comprises a second wavelength distance; and
   the first wavelength distance and the second wavelength distance are approximately equal.

3. The method of claim 1, wherein the source optical signal includes a quadrature phase-shift-keying ("QPSK") modulated signal.

4. The method of claim 1, wherein the source optical signal includes a dual-polarized QPSK ("DP-QPSK") modulated signal.

5. The method of claim 4, further comprising:
   separating the intermediate signal into an x-polarization component and a y-polarization component;
   performing degenerate phase-sensitive amplification for the x-polarization component, wherein duplicating the intermediate optical signal includes duplicating the x-polarization component to yield the first duplicate signal and the second duplicate signal;
   performing degenerate phase-sensitive amplification for the y-polarization component, comprising:
      duplicating the y-polarization component to yield a third duplicate signal and a fourth duplicate signal;
      phase-shifting the third duplicate signal; and
      passing the phase-shifted third duplicate signal and the fourth duplicate signal bi-directionally through a second nonlinear optical element.

6. The method of claim 4, further comprising:
separating the first duplicate signal into a first x-polarization component and a first y-polarization component;
separating the second duplicate signal into a second x-polarization component and a second y-polarization component;
performing degenerate phase-sensitive amplification for the x-polarization components, wherein passing the phase-shifted first duplicate signal and the second duplicate signal bi-directionally through the first nonlinear optical element includes passing the first x-polarization component and the second x-polarization component bi-directionally through the first nonlinear optical element; and
performing degenerate phase-sensitive amplification for the y-polarization components, comprising passing the first y-polarization component and the second y-polarization component bi-directionally through a second nonlinear optical element.

7. The method of claim 1, wherein performing degenerate phase-sensitive amplification comprises performing four-wave mixing utilizing the phase-shifted first duplicate signal and the second duplicate signal.

8. The method of claim 1, wherein:
performing degenerate phase-sensitive amplification on the phase-shifted first duplicate signal comprises performing degenerate phase-shift amplification on the real portion of the source optical signal; and
performing degenerate phase-sensitive amplification on the second duplicate signal comprises performing degenerate phase-shift amplification on the imaginary portion of the source optical signal.

9. The method of claim 1, wherein the first duplicate signal is phase-shifted by 90°.

10. The method of claim 1, wherein the phase-shifted first duplicate signal and the second duplicate signal are simultaneously passed bi-directionally through the first nonlinear optical element.

11. A system for regenerating optical signals, comprising:
an input configured to accept a source optical signal;
a dual-pump source configured to generate a first pump optical signal and a second pump optical signal;
a coupler communicatively coupled to the input and the dual-pump source configured to add the first pump optical signal and the second pump optical signal to the source optical signal to yield an intermediate optical signal;
a first wavelength selective processor configured to accept the intermediate optical signal;
a first nonlinear optical element communicatively coupled at two ends to the first wavelength selective processor;
wherein the first wavelength selective processor is configured to:
duplicate the intermediate optical signal to yield a first duplicate signal and a second duplicate signal;
phase-shift the first duplicate signal; and
send the phase-shifted first duplicate signal and the second duplicate signal through the first nonlinear optical element in opposite directions;
wherein the first nonlinear optical element is configured to perform degenerate phase-sensitive amplification on the phase-shifted first duplicate signal and the second duplicate signal; and
wherein the first wavelength selective processor includes a wavelength selective switch.

12. The system of claim 11, wherein:
the difference between a wavelength of the first pump optical signal and a wavelength of the source optical signal comprises a first wavelength distance;
the difference between a wavelength of the second pump optical signal and a wavelength of the source optical signal comprises a second wavelength distance; and
the first wavelength distance and the second wavelength distance are approximately equal.

13. The system of claim 11, wherein the source optical signal includes a QPSK modulated signal.

14. The system of claim 11, wherein the source optical signal includes a DP-QPSK modulated signal.

15. The system of claim 14, further comprising:
a beam splitter communicatively coupled between the coupler and the first wavelength selective processor configured to separate the intermediate signal into an x-polarization component and a y-polarization component;
a second wavelength selective processor communicatively coupled to the beam splitter, comprising a wavelength selective switch;
a second optical nonlinear element communicatively coupled at two ends to the second wavelength selective processor;
wherein:
the beam splitter is configured to send the x-polarization component to the first wavelength selective processor and the y-polarization component to the second wavelength selective processor;
configuring the first wavelength selective processor to duplicate the intermediate optical signal includes configuring the first wavelength selective processor to duplicate the x-polarization component to yield the first duplicate signal and the second duplicate signal;
the second wavelength selective processor is configured to:
duplicate the y-polarization component to yield a third duplicate signal and a fourth duplicate signal;
phase-shift the third duplicate signal; and
send the phase-shifted third duplicate signal and the fourth duplicate signal through the first nonlinear optical element in opposite directions; and
the second nonlinear optical element is configured to perform degenerate phase-sensitive amplification on the phase-shifted third duplicate signal and the fourth duplicate signal.

16. The system of claim 14, further comprising:
a second nonlinear optical element communicatively coupled at two ends to the first wavelength selective processor;
a first beam splitter:
communicatively coupled between the first wavelength selective processor and a first terminal of the first optical nonlinear element and between the first wavelength selective processor and a first terminal the second optical nonlinear element;
configured to separate the phase-shifted first duplicate signal into a first x-polarization component and a first y-polarization component; and
configured to send the first x-polarization component to the first terminal of the first optical nonlinear element and to send the first y-polarization component to the first terminal of the second optical nonlinear element;
a second beam splitter:
communicatively coupled between the first wavelength selective processor and a second terminal of the first optical nonlinear element and between the first wavelength selective processor and a second terminal the second optical nonlinear element;

configured to separate the second duplicate signal into a second x-polarization component and a second y-polarization component; and configured to send the second x-polarization component to the second terminal of the first optical nonlinear element and to send the second y-polarization component to the second terminal of the second optical nonlinear element;

wherein configuring the first nonlinear optical element to perform degenerate phase-sensitive amplification on the phase-shifted first duplicate signal and the second duplicate signal comprises configuring the first nonlinear optical element to perform degenerate phase-sensitive amplification on the first x-polarization component and the second x-polarization component; and the second nonlinear optical element is configured to perform degenerate phase-sensitive amplification on the first y-polarization component and the second y-polarization component.

17. The system of claim 11 wherein configuring the first nonlinear optical element to perform degenerate phase-sensitive amplification comprises configuring the first nonlinear optical element to performing four-wave mixing utilizing the phase-shifted first duplicate signal and the second duplicate signal.

18. The system of claim 11, wherein:
configuring the first nonlinear optical element to perform degenerate phase-sensitive amplification on the phase-shifted first duplicate signal comprises configuring the first nonlinear optical element to perform degenerate phase-shift amplification on the real portion of the source optical signal; and configuring the first nonlinear optical element to perform degenerate phase-sensitive amplification on the second duplicate signal comprises configuring the first nonlinear optical element to perform degenerate phase-shift amplification on the imaginary portion of the source optical signal.

19. The system of claim 11, wherein the first wavelength selective processor is configured to phase-shift the first duplicate signal by 90°.

20. The system of claim 11, wherein the first wavelength selective processor is configured to simultaneously send the phase-shifted first duplicate signal and the second duplicate signal bi-directionally through the first nonlinear optical element.

* * * * *